United States Patent
Frauhammer et al.

(10) Patent No.: US 7,137,457 B2
(45) Date of Patent: Nov. 21, 2006

(54) HAND-HELD MACHINE TOOL

(75) Inventors: Karl Frauhammer, Leinfelden-Echterdingen (DE); Gerhard Meixner, Filderstadt (DE); Heinz Schnerring, Dettenhausen (DE); Willy Braun, Neustetten (DE); Axel Kuhnle, Freiberg A.N. (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/513,522

(22) PCT Filed: Apr. 7, 2004

(86) PCT No.: PCT/DE2004/000726

§ 371 (c)(1),
(2), (4) Date: Nov. 4, 2004

(87) PCT Pub. No.: WO2004/108350

PCT Pub. Date: Dec. 16, 2004

(65) Prior Publication Data

US 2005/0161242 A1 Jul. 28, 2005

(30) Foreign Application Priority Data

May 30, 2003 (DE) ................. 103 24 426

(51) Int. Cl.
*B25D 1/02* (2006.01)
(52) U.S. Cl. .................. 173/29; 173/132; 279/22; 279/904
(58) Field of Classification Search .......... 173/29, 173/132; 279/22, 30, 901, 904, 905
See application file for complete search history.

(56) References Cited

U.S. PATENT DOCUMENTS

| | | | | |
|---|---|---|---|---|
| 2,926,020 A | * | 2/1960 | Dayton et al. ............... 279/75 |
| 3,428,327 A | * | 2/1969 | Sindelar ...................... 279/82 |
| 4,284,148 A | | 8/1981 | Wanner et al. |
| 4,502,824 A | * | 3/1985 | Dohse et al. ............... 409/234 |
| 5,174,696 A | * | 12/1992 | Bogner ....................... 408/206 |
| 5,199,833 A | * | 4/1993 | Fehrle et al. ........... 408/239 R |
| 5,437,465 A | * | 8/1995 | Vogele et al. ................ 279/22 |
| 5,603,516 A | * | 2/1997 | Neumaier ................. 279/19.5 |
| 6,135,461 A | * | 10/2000 | Below et al. .............. 279/19.4 |
| 6,179,300 B1 | * | 1/2001 | Baumann et al. .......... 279/19.4 |
| 6,343,903 B1 | * | 2/2002 | Huang et al. ............... 409/231 |
| 2001/0017447 A1 | * | 8/2001 | Baumann et al. .......... 279/19.4 |
| 2003/0077136 A1 | | 4/2003 | Rohm |

FOREIGN PATENT DOCUMENTS

DE  25 51 125  5/1977

(Continued)

*Primary Examiner*—Stephen F Gerrity
*Assistant Examiner*—Paul Durand
(74) *Attorney, Agent, or Firm*—Michael J. Striker

(57) ABSTRACT

A hand power tool, in particular a drill hammer or jackhammer, is disclosed, which has a guide tube (11), a tool holder (24) that can be attached interchangeably to the guide tube (11), and a locking device (23) that locks the tool holder (24) to the guide tube (11), the locking device being manually releasable by means of an axial displacement of a slide sleeve (34) oriented away from the tool holder (24). To achieve a compact connection construction, which is economical in production terms, between the interchangeable tool holder (24) and the hand power tool, the tool holder (24) is embodied as insertable by an end portion (241) into a guide portion (111) embodied on the front end of the guide tube (11), in the inner wall thereof (FIG. 1).

27 Claims, 5 Drawing Sheets

FOREIGN PATENT DOCUMENTS

Figures 1, 2, 3:
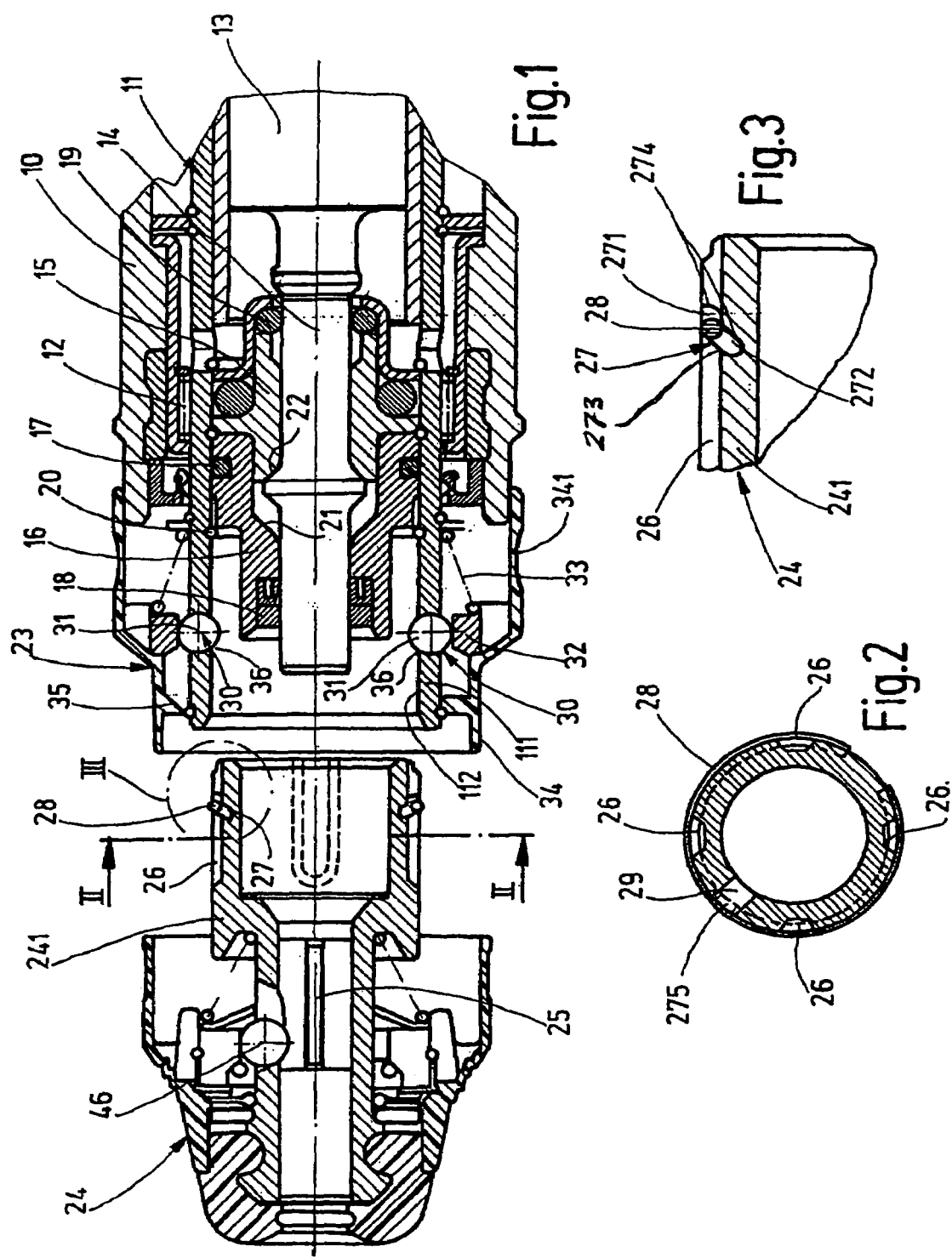

| | | |
|---|---|---|
| DE | 28 20 128 | 11/1979 |
| DE | 32 05 063 A1 | 10/1982 |
| DE | 93 05 463.7 | 8/1993 |
| GB | 2 096 045 | 10/1982 |

* cited by examiner

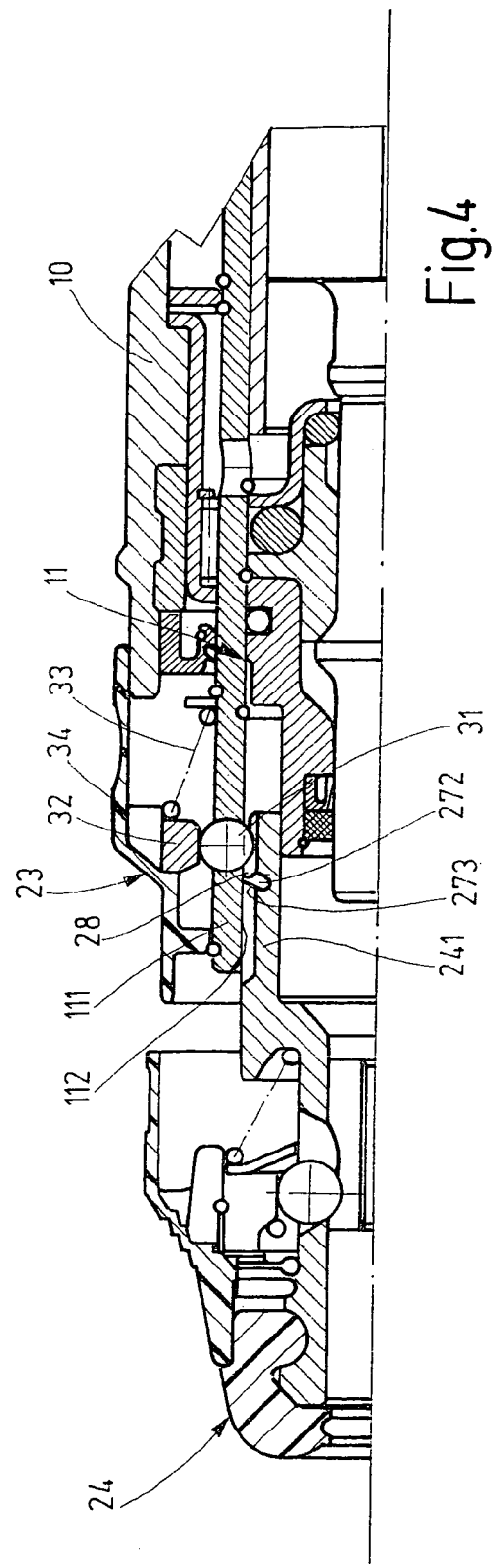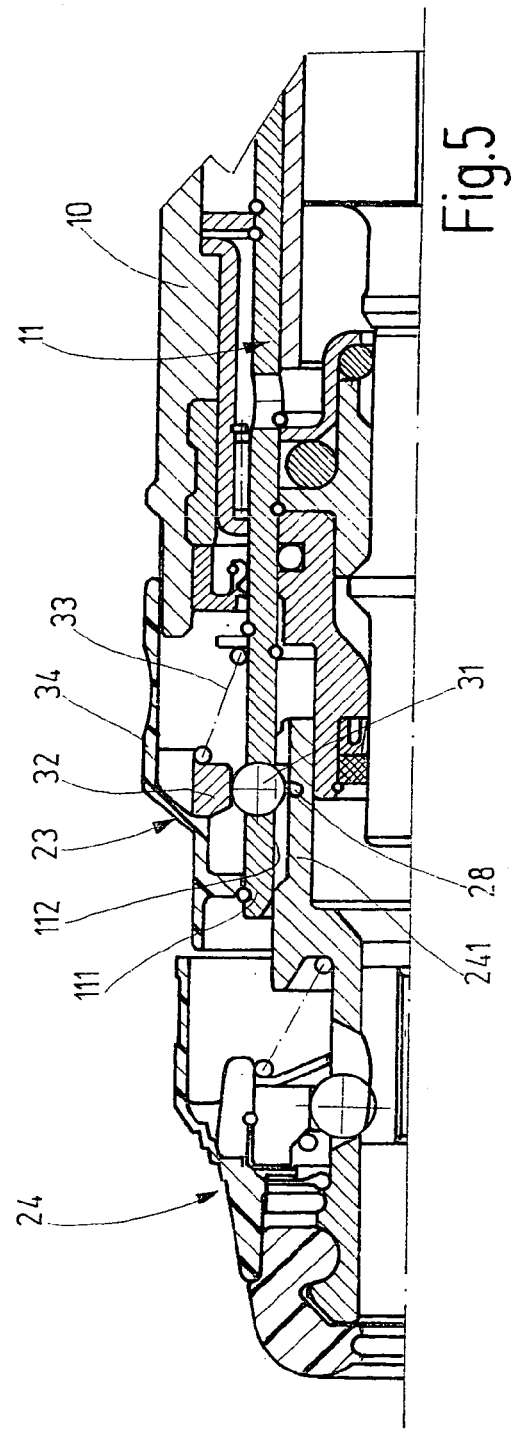

HAND-HELD MACHINE TOOL

PRIOR ART

The invention is based on a hand power tool, in particular a drill hammer or jackhammer.

In a known hand power tool (German Patent Disclosure DE 28 20 128 A1), the tool holder is joined integrally to a rotary sleeve, which is supported rotatably on the guide tube and can be set into rotation by means of a rotary drive mechanism. The guide tube is disposed in stationary fashion in the tool housing and axially displaceably receives a drive piston of a so-called hammering mechanism and a hammering piston or header, and this drive piston is set into a reciprocating axial motion by a swash drive mechanism. An air cushion is enclosed between the drive piston and the header. If the hammering mechanism is switched on, then the drive piston acts on the header via the air cushion, and the header imparts its impact energy directly to the tool chucked axially displaceably and fixed against relative rotation in the tool holder. If the rotary drive mechanism is switched on as well, then the tool holder is set into rotation and thus also rotates the tool.

A known interchangeable tool holder for a hand power tool, in particular for a drill hammer and/or jackhammer (German Patent 32 05 063 C2) is fixed, axially limitedly displaceably and in a manner fixed against relative rotation, directly on a drive spindle that executes a rotary and reciprocating motion, the fixation being done by means of a locking device. To that end, the tool holder has an end region that can be slipped onto the drive spindle and that is in a state of rotary slaving with the drive spindle via a spline profile. At least one radial bore is disposed in this end region, and a ball is disposed radially displaceably as a locking body in this radial bore. The ball engages a longitudinal groove extending all the way around the drive spindle and locks the tool holder with axial play against being pulled off in the axial direction. A slide sleeve serving to chuck the tool in the tool holder fits over the ball and blocks radial displacement of it. If the slide sleeve is manually displaced with force toward the front end, it releases the at least one ball, and with the slide sleeve kept in its displaced position, the tool holder can be pulled off the guide tube.

In a known hand power tool with a guide tube supported rotatably in the tool housing and with an interchangeable tool holder (Bosch hammer type No. 0611 249 700) that can be mounted on the end region protruding from the tool housing, the end portion of the tool holder that fits over the guide tube has four radial bores, offset from one another by rotational angles of 90° each, and in each, a ball representing a locking body rests radially displaceably and is secured against falling out of the radial bore. In the locking position of the tool holder, the balls rest in depressions that are machined into the guide tube, offset from one another by equal rotational angles. A rotationally displaceably retained slide sleeve fits over the balls with a radially inward-protruding annular strut and thereby prevents any radial displacement whatever of the ball. Not until the slide sleeve is moved rearward manually in the direction of the tool housing by a rotational/sliding motion does the annular strut release the balls, and only then can the tool holder be taken off the guide tube, with the slide sleeve being held in displaced fashion.

ADVANTAGES OF THE INVENTION

The hand power tool of the invention has the advantage that the centering of the tool holder in the guide tube, done via the outer diameter of the tool holder and the inner diameter of the guide tube, the connecting construction of the interchangeable tool holder and the hand power tool can be made compactly and economically. Both the tool holder and the guide tube can be embodied as tubular bodies without large differences in diameter, which markedly minimizes the effort and expense of material and machining and thus the overall production cost. Grinding the tool holder on the outside is substantially more favorable from the standpoint of both production and cost than grinding on the inside. Nor is this advantage cancelled out by the requisite grinding of the inside wall of the guide tube in the guide portion, since the guide tube must be ground anyway for the sake of axial guidance of drive elements of a hammering mechanism. By means of the large ratio of diameter to length that is possible for the end portion of the tool holder and the guide portion of the guide tube, very good concentricity properties of the tool holder are attained.

By means of the provisions recited in the other claims, advantageous refinements of and improvements to the hand power tool are possible.

In an advantageous embodiment of the invention the locking device has at least one locking body retained radially displaceably in the guide tube, and at least one locking pocket, which cooperates with the locking body for axially locking the tool holder, is disposed in the end portion of the tool holder. In addition, a spring-elastic blocking element is provided, which rests on the at least one locking body or in the at least one locking pocket in such a way that upon insertion of the tool holder into the guide tube, it permits a relative displacement of the end portion of the tool holder with respect to the guide portion of the guide tube until the locking body plunges into the locking pocket. By these structural provisions, the locking device can be manufactured very economically. Making the locking pocket on the outer jacket of the tool holder by milling can be attained from a production standpoint equally advantageously as the axial retention of the at least one locking body in the guide tube, by the provision of a simple radial bore that penetrates the tube wall and receives the locking body. The blocking element makes it possible to insert the tool holder into the guide tube with one hand, with automatic locking of the tool holder, without additional actuation of the locking device.

In a preferred embodiment of the invention, the at least one locking pocket on the tool holder is dimensioned such that its axial length is a multiple of the axial length of the locking body. By means of this structural provision, some of the requisite idle travel distance of a hammering mechanism axially acting on the tool is executed by the tool holder, which shortens the relative distance of the tool in the tool holder. Because of the shorter relative distance of the tool in the tool holder, it is possible in the case of a so-called SDS-plus tool holder, as described for instance in German Patent DE 25 51 125 C2, to lengthen the rotary slaving strips in the tool holder while keeping the length of the tool holder unchanged, which leads to a reduction in the rotational load on the rotary slaving strips and thus to a longer service life of the tool holder. In the engaged hammering state, the structural length of the drill hammer is reduced by the displacement distance of the tool holder. The idling quality of the hand power tool is moreover improved, since the impact energy that is released at the transition from the hammering mode to the idling can be absorbed by the axial degree of freedom of the tool holder; as a result, a majority of the hammering impetus in the tool holder is broken down, and only a fraction of it is reflected back into the tool housing. The quality of use is thus improved, and the stress on structural parts is reduced. The header of the hammering mechanism can be kept short and in a simple form, which makes it possible to use the most economical production technologies.

In an advantageous embodiment of the invention the at least one locking pocket comes to an end in the open on the face end of the end portion of the tool holder. The spring element has a strut, crossing the locking pocket, that can be pressed counter to spring force into a transverse groove machined into the bottom of the pocket. Preferably, the strut is formed by an annular portion of a spring ring, acting as forming the blocking element, that rests in an annular groove machined into the end portion of the tool holder and crossing the at least one locking pocket. The annular groove is graduated in the radial direction and has an upper groove portion with a greater groove width and a groove depth corresponding to the pocket depth, and a lower groove portion with a smaller groove width. The groove flanks are shaped such that the spring ring resting in the upper groove portion can be pressed into the lower groove portion solely upon the insertion of the tool holder into the guide tube. The spring ring is not embodied in closed form, so that it can be thrust in the radial direction past the end portion of the tool holder. Advantageously, it is provided with a bulge with which it engages a radial fixation bore made in the end portion, preventing the spring ring from rotating on the end portion. This structural feature for assuring one-handed positioning of the tool holder against the hand power tool also has advantages in terms of production, since the annular groove can be simply punched into the end portion of the tool holder from outside, and the spring ring, produced with minimal production cost can simply be pressed into the annular groove past the end portion of the tool holder by means of a simple mounting operation.

In an alternative embodiment of the invention, the at least one locking body is retained radially and axially displaceably in an oblong slot that penetrates the guide tube wall, and the spring-elastic blocking element presses the locking body against the front edge of the hole, in terms of the insertion direction. If while the tool holder is being attached the end portion of the tool holder strikes the locking body, then the locking body is thrust axially against the blocking element in the oblong slot upon further insertion and can radially deflect after a displacement travel distance. As soon as the locking pocket reaches the region of the axially and radially displaced locking body, the locking body is inserted by the blocking element into the locking pocket.

In an advantageous embodiment of the invention, the spring-elastic blocking element has an annular disk, which is acted upon by a spring force oriented counter to the insertion direction and which rests on the back side, remote from the tool holder, of the at least one locking body. Preferably, the spring force is derived from a restoring spring which is braced on one end on the guide tube and on the other on the annular disk. This structural variant of the locking device for assuring one-handed attachment of the tool holder to the hand power tool with automatic locking of the tool holder can likewise be achieved by means of production operations that economize in both material and production time.

In an advantageous embodiment of the invention, an axially limitedly displaceably guided impact deflector hood is disposed in the guide tube, which impact deflector hood plunges with one end into the end portion of the tool holder and is sealed off on the outside from the inner wall and on the inside from a header of a hammering mechanism. Preferably, the sealing off from the header is performed on the front region of the impact deflector hood, so that the sealing is located near the region where dust penetrates, and a wear-reducing lubricant film is maintained in the impact-deflection hood. By means of this impact deflector hood, both the header and the rest of the hammering mechanism are sealed off very well from dust from the outside, so that the vulnerability of the hand power tool to dust becomes uncritical.

In an advantageous embodiment of the invention, the impact deflector hood has a front stop face for the header and is embodied such that at the transition to idling of the hand power tool, it is capable of absorbing the impact energy transmitted. The axial displaceability of the impact deflector hood, whose displacement travel is approximately equivalent to the axial displacement travel of the tool holder, and the described energy-absorbing design of the impact deflector hood make a simple, short, symmetrical header possible that can be produced economically by extrusion.

DRAWING

Figure 6:
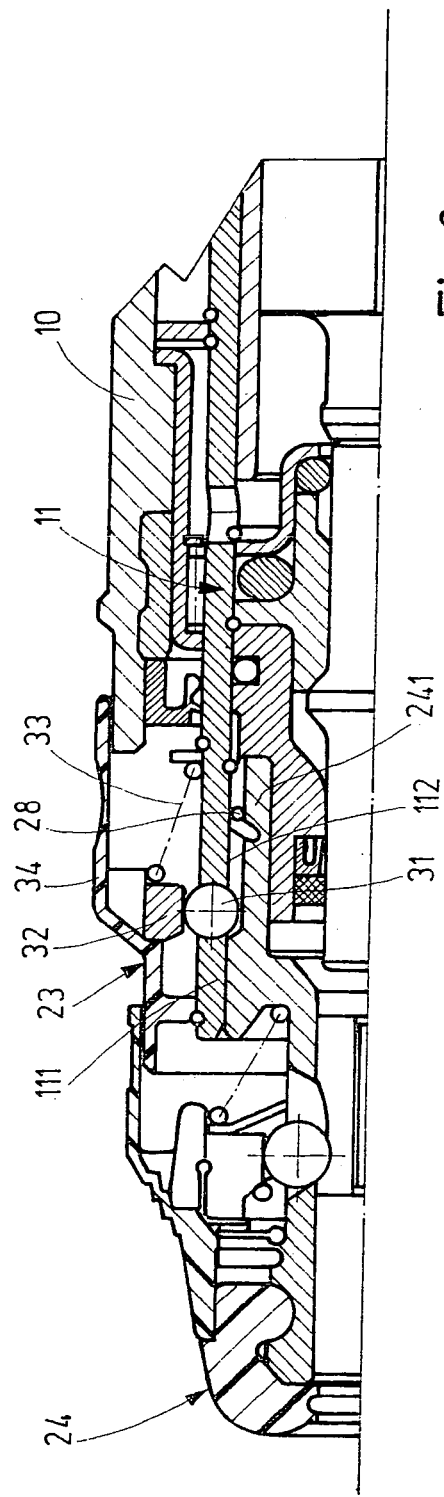
Figure 7:
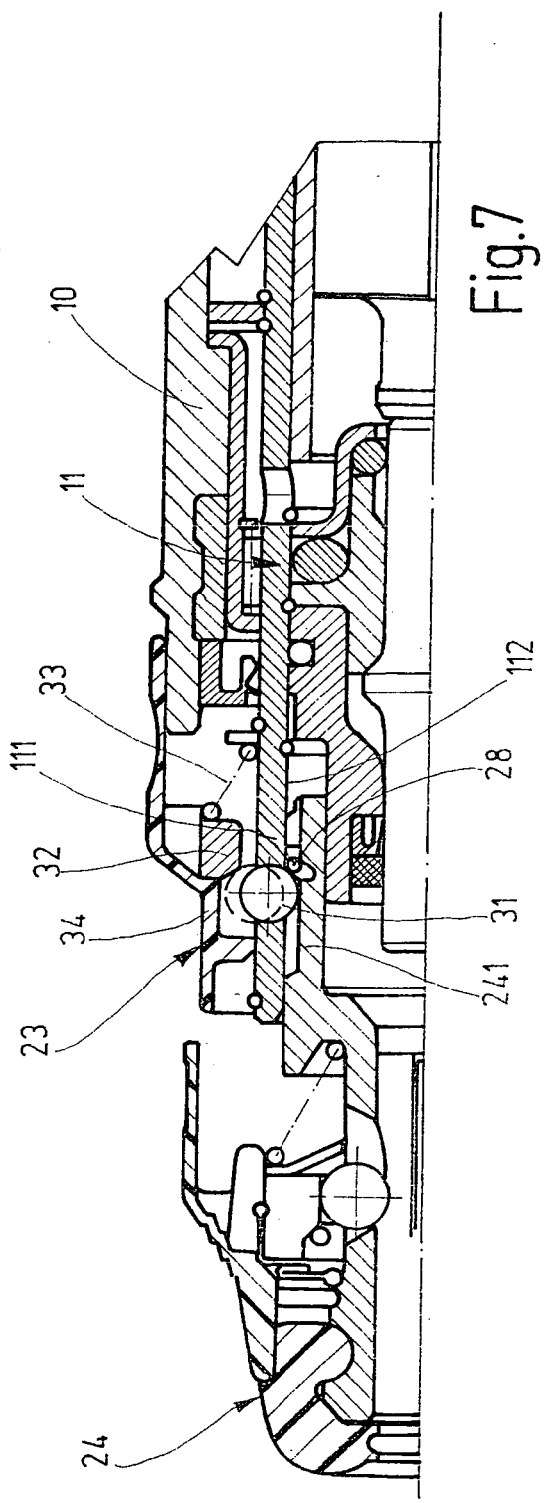
Figure 8:
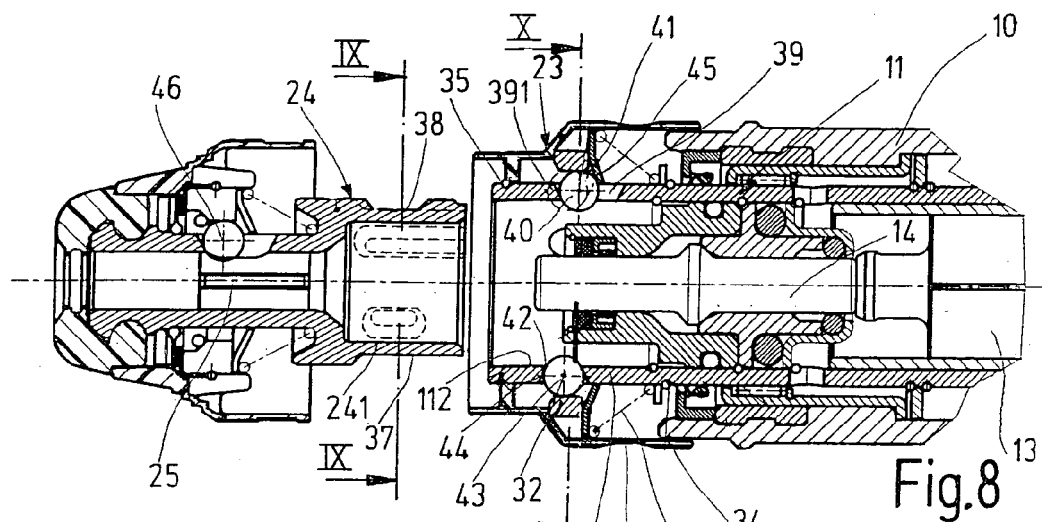
Figure 9:
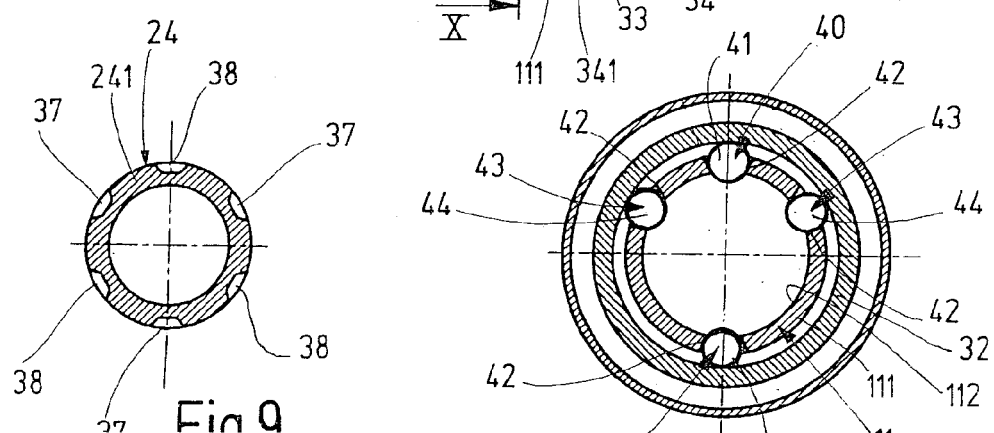
Figure 10:
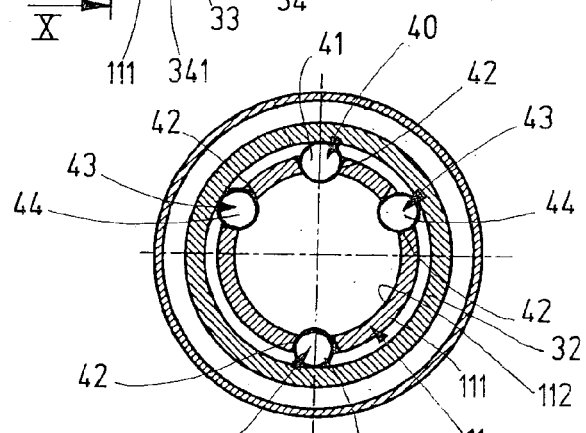
Figure 11:
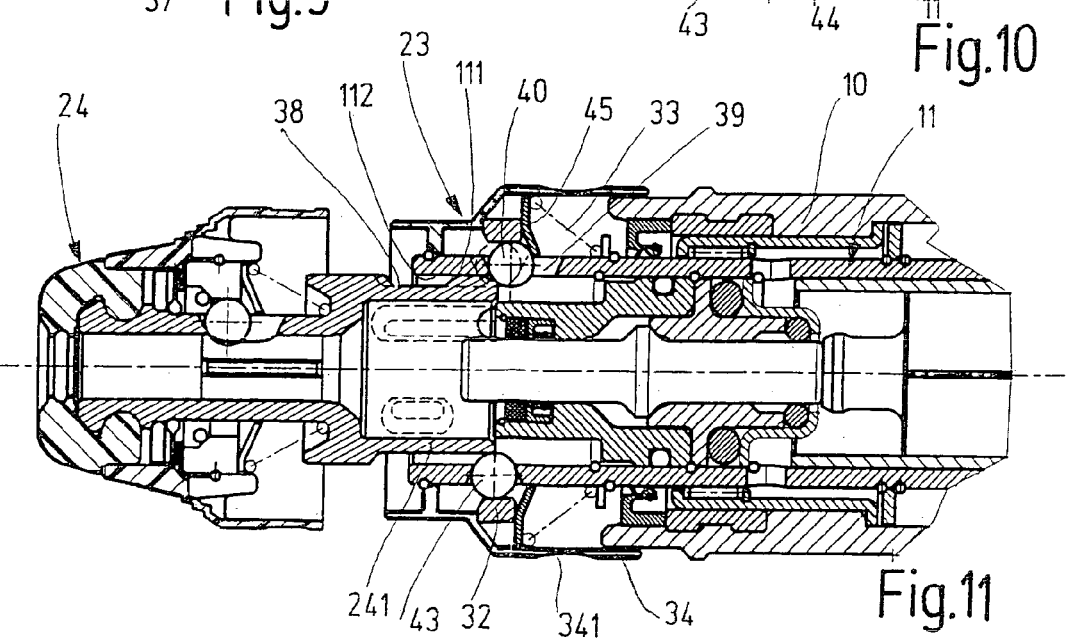
Figure 12:
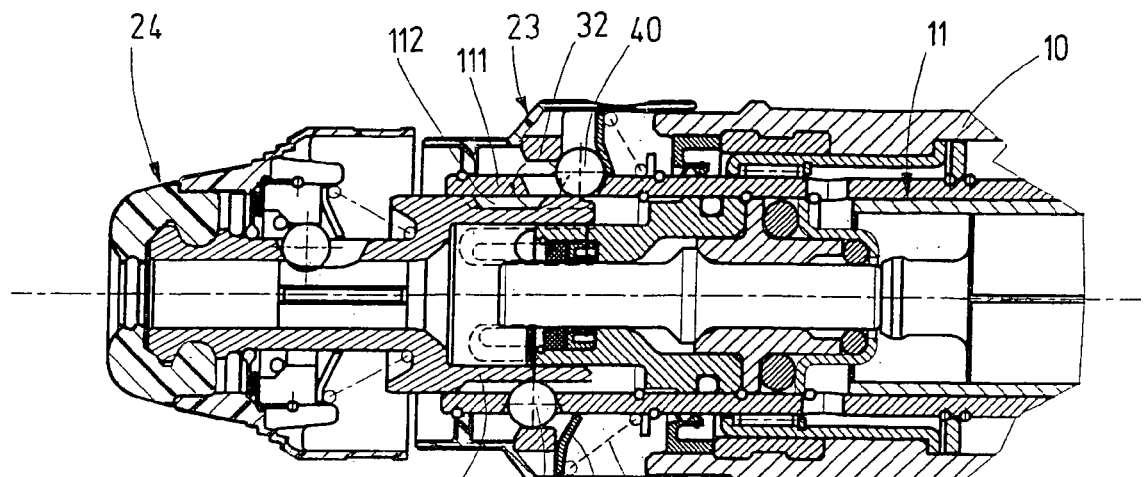
Figure 13:
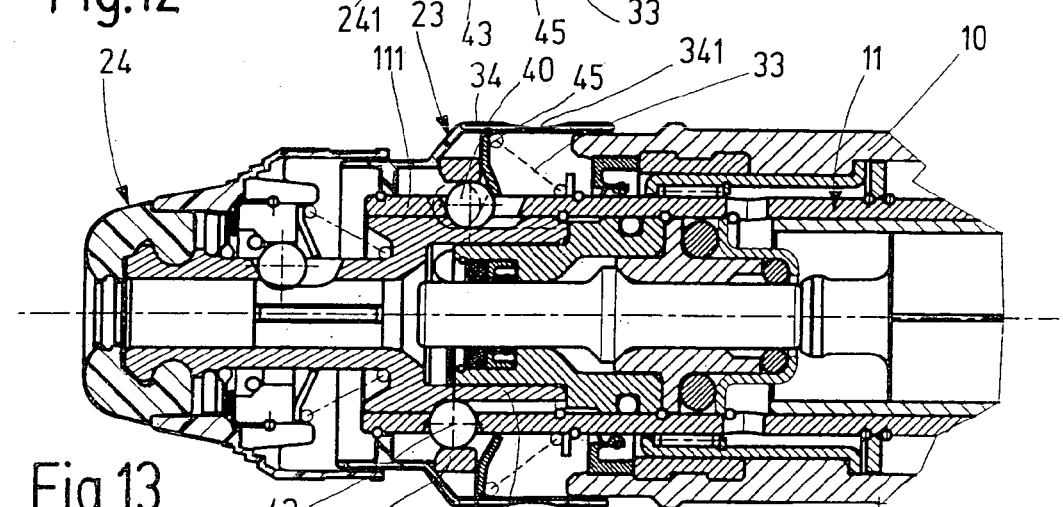
Figure 14:
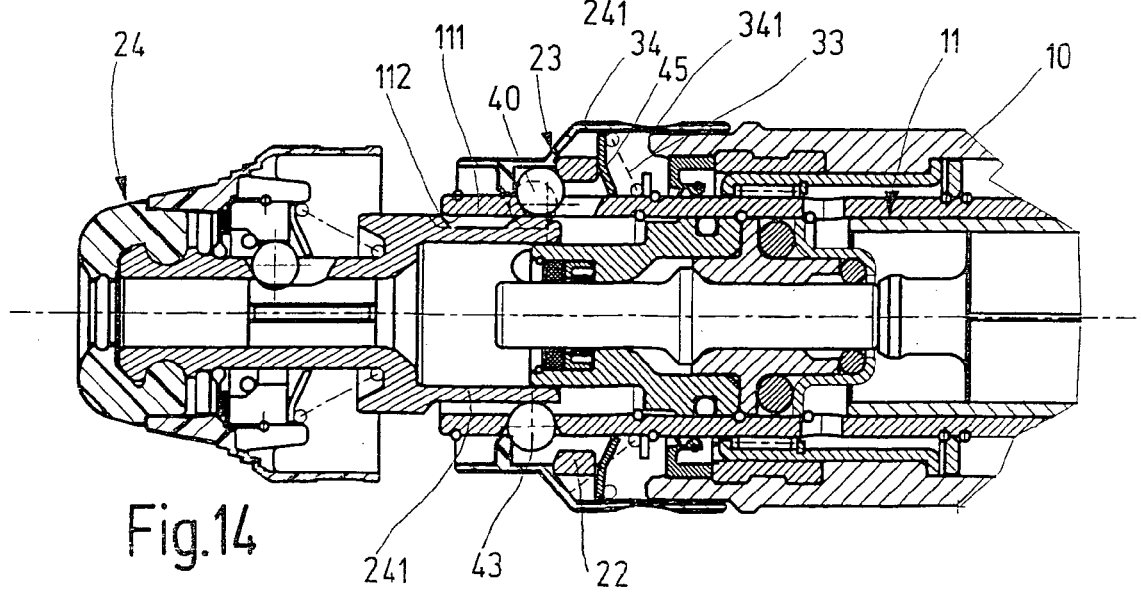

The invention is explained in further detail in the ensuing description in terms of an exemplary embodiment shown in the drawing. Shown are:

FIG. 1, a fragmentary longitudinal section of a drill hammer, with an interchangeable tool holder that has been taken off the drill hammer;

FIG. 2, a section taken along the line II—II in FIG. 1;

FIG. 3, an enlarged view of the detail marked III in FIG. 1;

FIGS. 4 and 5, each, a fragmentary longitudinal section of the drill hammer of FIG. 1, with the tool holder attached, to illustrate the process of mounting the tool holder;

FIG. 6, a fragmentary longitudinal section of the drill hammer, with the tool holder attached, in the operating position;

FIG. 7, a fragmentary longitudinal section of the drill hammer of FIG. 1 with the tool holder unlocked, to illustrate the process of detaching the tool holder;

FIG. 8, a fragmentary longitudinal section of a drill hammer with the tool holder taken off the drill hammer, with a modified locking device;

FIG. 9, a section taken along the line IX—IX in FIG. 8;

FIG. 10, a section taken along the line X—X in FIG. 8;

FIGS. 11 through 13, each, a fragmentary longitudinal section of the drill hammer with the tool holder attached, to illustrate the process of mounting the tool holder;

FIG. 14, a fragmentary longitudinal section of the drill hammer of FIG. 8, with the tool holder unlocked, to illustrate the process of detaching the tool holder.

DESCRIPTION OF THE EXEMPLARY EMBODIMENT

The drill hammer shown in a fragmentary longitudinal section in FIG. 1 as an exemplary embodiment for a hand power tool has a tool housing 10, in which a guide tube 11 is rotatably received by means of a needle-bearing 12 and can be set into rotation by a rotary drive mechanism not shown here. A drive piston 13 and a beater or header 14 of a hammering mechanism are received axially displaceably in the guide tube 11. The drive piston 13 is set into a reciprocating motion by a swash drive mechanism, for instance, and in the process meets the header 14, which transmits the impact energy to a tool. One example of a hammering mechanism is described in DE 28 20 128 A1. In the exemplary embodiment presented here, the header 14 is retained axially displaceably in a guide member 15 that is fixed axially nondisplaceably in the guide tube 11. The header 14 is embraced by an impact deflector hood 16, which is axially displaceably guided in the guide tube 11 and is sealed off from the inner wall of the guide tube 11 by an O-ring 17 and from the header 14 by a shaft seal and felt ring combination 18 in the front region of the header 14. The header 14 is embodied mirror-symmetrically in its longitudinal direction and with its rear portion, oriented away from the impact deflector hood 16, it is guided axially displaceably in the guide member 15 and is sealed off from the guide member 15 by a further O-ring 19. The axial displacement travel of the impact deflector hood 16 is defined on one end by the guide member 15 and on the other by a securing ring 20, which rests in an annular groove that has been punched into the inner wall face of the guide tube 11. A front stop face 21 and a rear stop face 22 for the header 14 are embodied on the impact deflector hood 16 and on the guide member 15, respectively.

The guide tube 11 protrudes on its face end with a protruding region 111 from the tool housing 10, and in this region, into which the header 14 with the impact deflector hood 16 also protrudes, it has a locking device 23 for a tool holder 24. The tool holder 24, which in this exemplary embodiment is embodied as a so-called SDS-plus tool holder, serves the purpose of chucking a tool, which is received in a manner fixed against relative rotation but axially displaceably in the tool holder 24 and to that end has rotary slaving strips 25 and at least one locking ball 46, which engage axial longitudinal grooves that are made in the tool shaft. One example of such a tool holder is described at length in German Patent DE 32 05 063 C2. The impact deflector hood 16 is shaped such that at the transition to idling, it absorbs the energy of the header 14 and passes it on to the axially displaceable tool holder 24 resting on the impact deflector hood 16.

The tool holder 24 has an end portion 241, with an outer diameter adapted to the inner diameter of the guide tube 11. With this end portion 241, the tool holder 24 is received axially displaceably in a guide portion 112, embodied in the protruding region 111 of the guide tube 11 on the inner wall face thereof. A plurality of locking pockets 26 extending axially, in this case preferably four of them, are embodied in the end portion 241, offset on the circumference from one another by equal rotational angles. An annular groove 27 is also machined into the end portion 241 and intersects the locking pockets 26. The annular groove 27 is radially graduated and has an upper groove portion 271, with a greater groove width and a radial depth corresponding to the radial depth of the locking pockets 26, and a groove portion 272, adjoining the upper one, with a smaller groove width (FIG. 3). The annular groove 27 also has a rear groove flank 273, in terms of the insertion direction, which is positioned in inclined fashion, that is, at an acute angle to the insertion direction, and a front groove flank 274, in terms of the insertion direction of the tool holder 24, that extends approximately radially to the rear groove flank 273 in the upper groove portion 271 and parallel to that flank in the lower groove portion 272. A spring ring 28 rests in the annular groove 27 and forms a spring-elastic blocking element serving to lock the tool holder 24 axially to the guide tube 11. The diameter of the spring ring 28 is somewhat greater than the radial depth of the upper groove portion 271, so that the spring ring 28 protrudes somewhat past the outer contour of the end portion 241. The groove width of the lower groove portion 272 is slightly larger than the diameter of the spring ring 28, and the groove width of the upper groove portion 271 is at least twice as large. As can be seen from FIG. 2, the spring ring 28 is not closed but instead is interrupted and as a result can be thrust radially onto the end portion 241 of the tool holder 24. It has an axial bulge 275, which engages a fixation bore 29 made in the end portion 274 and prevents the spring ring 28 from rotating on the end portion 241.

The locking device 23 disposed on the guide tube 11 has a number of locking bodies 30 equivalent to the number of locking pockets 26, and these locking bodies are held axially nondisplaceably, with radial play, in the protruding region 111 of the guide tube 11 and are embodied for engagement with the locking pockets 26 on the tool holder 24. The engagement is designed such that via the locking bodies 30 and the locking pockets 26, a rotary slaving of the tool holder 24 when the guide tube 11 is rotating takes place. In the exemplary embodiment, the locking bodies 30 are formed by balls 31, which are retained in radial bores 36 that penetrate the guide tube wall and are offset from one another on the circumference of the guide tube 11 by the same rotational angles as the locking pockets 26 in the tool holder 24. A locking ring 32, fitting over the balls 31, blocks the radial play of the balls 31 in the locking position, seen in FIG. 1, of the locking device 23. The locking ring 32 is press-fitted in a slide sleeve 34. The slide sleeve 34, which has a depression 341 for use in grasping it, is axially displaceably held on the outside of the protruding region 111 of the guide tube 11 and fits over the tool housing 10. In its locking position, shown in FIG. 1, the slide sleeve 34 is placed against a stop, formed by a securing ring 35 resting in an annular groove embodied in the protruding region 111, by means of a conical compression spring 3, functioning as a restoring spring and braced on the guide tube 11 and on the locking ring 32. In this locking position, the locking ring 32 encloses the balls 31. If the slide 34 is displaced to the rear in the direction of the tool housing 10, counter to the spring force of the compression spring 33, the locking ring 32 slides off the balls 31, and these balls can execute a limited radial motion.

In FIGS. 4 and 5, the process of mounting the tool holder 24 is illustrated. The tool holder 24 is inserted by its end portion 241 into the guide portion 112 in the protruding region 111 of the guide tube 11. The locking device 23 is unactuated and is retained in its locking position by the compression spring 33, in which position the radial play of the balls 31 is blocked by the locking ring 32. Upon insertion, the spring ring 28, which rests in the upper groove portion 271 and protrudes somewhat past the outer circumference of the end portion 241, comes to a stop against the balls 31, which protrude radially inward in the guide portion 112 (FIG. 4). With somewhat increased displacement force, the tool holder 24 can now be moved farther in the insertion direction. In the process, the spring ring 28 is pressed into the lower groove portion 272 by the balls 31 along the rear groove flank 273, and the spring ring 28 can be displaced farther, past and underneath the balls 31 (FIG. 5). Once the maximum compression spring of the spring ring 28 has been bridged, the spring ring 28 snaps radially outward again because of its prestressing, into the upper groove portion 271, and now locks the tool holder 24 in the guide tube 11. In FIG. 6, the drill hammer is shown in the operating position. The radial deflection of the balls 31 is prevented by the locking ring 32. In the idle position, the tool holder 24 moves forward enough that the spring ring 28 strikes the balls 31. Since the spring ring 28 now rests on the front, radial groove flank 274 in the upper groove portion 271, it can deflect neither axially nor radially, so that the tool holder 24 is fixed reliably securely to the guide tube 11.

For detaching the tool holder 24, the locking device 23 should be released manually; this is done by displacing the slide sleeve 34 to the rear into the unlocking position in the direction of the tool housing 10 (FIG. 7). As a result, the locking ring 32 is pulled away from the balls 31. If, with the slide sleeve 34 retained in the unlocking position, the tool holder 24 is drawn farther to the left in terms of FIG. 7, then the spring ring 28 presses the balls 31 radially outward, as indicated by dashed lines in FIG. 7. The tool holder 24 can thus be pulled out of the guide tube 11, underneath the balls 31.

The drill hammer shown in FIG. 8 in a fragmentary longitudinal section with the tool holder 24 taken off is modified, compared to the drill hammer described above, only with respect to the embodiment of the locking device 23. The end portion 241 of the tool holder 24 has a number of slaving pockets 37, in this case three of them, offset by equal circumferential angles, in this case 120°; like the locking pockets 26 in FIG. 1, they come to an end in the open at the face end of the end portion 241. Also, an equal number, in this case three, of locking pockets 38 is machined into the end portion 241; they are offset from one another by the same circumferential angles as the slaving pockets 37, in this case 120°. The slaving pockets 37 and locking pockets 38 all have the same rotational angle spacing from one another, in this case 60° (FIG. 9). The locking pockets 38 are axially defined with spacing from the face end of the end portion 241. An oblong slot 39 that penetrates the guide tube wall is disposed in the protruding region 111 of the guide tube 11, and a locking body 40, embodied as a ball 41, is retained radially and axially displaceably in this oblong slot. A number of radial bores 42, penetrating the guide tube wall and offset from one another by equal rotational angles, are also made in the guide tube 121 in the protruding region 111, and a slaving body 43, also embodied as a ball 44, rests in each of the radial bores. The number of radial bores 42 and slaving bodies 43 or balls 44 corresponds to the number of slaving pockets 37 present in the end portion 241, and the rotational angle spacing of the radial bore 42 corresponds to the rotational angle spacing of the slaving pockets 37. In the exemplary embodiment shown, there are accordingly three radial bores 42 in the protruding region 111 of the guide tube 11, and they are offset from one another by 120° in a radial plane. As FIG. 10 shows, the oblong slot 39, with the locking body 40 resting in it, is disposed symmetrically between two radial bores 42 with slaving bodies 43 resting in them, so that the rotational angle spacing of the oblong slot 39 from the radial bores 42 is 60°. The slaving bodies 43, protruding inward in the guide portion 112 of the guide tube 11, and the slaving pockets 37 are adapted to one another in such a way that the slaving bodies 43, after plunging into the slaving pockets 37, carry the tool holder 24 in the direction of rotation with them when the guide tube 11 is rotating. The locking body 40, which engages the locking pocket 38 when the tool holder 24 has been put on, enables an axial motion of the tool holder 24 relative to the guide tube 11 and prevents the tool holder 24 from being pulled off the guide tube 11 unintentionally.

Otherwise, the construction of the locking device 23 matches the locking device 23 of FIG. 1, so that identical components are identified by the same reference numerals. The same is also true for the further construction of the drill hammer, in terms of the guidance and disposition of the header 14 for axial action on the tool chucked in the tool holder 24. In the same way, the locking device 23 has the slide sleeve 34 with the locking ring 32 press-fitted in it, which sleeve, in the locking position shown in FIG. 8, is pressed against the front stop, formed by the securing ring 35, on the guide tube 11 by the conical compression spring 33 functioning in turn as a restoring spring. The compression spring 33 is braced on an annular disk 45, which in turn rests on the locking ring 32 and presses against the back side, remote from the tool holder 24, of the locking body 40 or ball 41. The locking body 40 or ball 41 is thereby pressed against the front edge 391, in terms of the insertion direction of the tool holder 24, of the oblong slot 39. The annular shoulder 45 and compression spring 33 form a spring-elastic blocking element serving the purpose of axially locking the tool holder 24 to the guide tube 11. The slaving bodies 43 are located, as a result of the corresponding offset of the radial bores 42, approximately 2 mm ahead of the locking body 40, so that with the aid of the slaving pockets 37 they make it possible to align the rotary position of the tool holder 24 relative to the guide tube 11. This provision and the slight rotational angle offset of the locking body 40 relative to the slaving bodies 43, in this case by 60°, assure that the tool holder 24 can be slipped on in a user-friendly way, without mistakes.

The mounting of the tool holder, that is, the attachment of the tool holder 24 to the drill hammer, which is shown in FIGS. 11 through 13, is done as follows:

Once the rotary position is found, the tool holder 24 is inserted into the guide portion 112 of the guide tube 11, and the face end of the end portion 241 of the tool holder 24 strikes the locking body 40 that protrudes radially inward in the guide portion 112. The locking body 40 is blocked in its possible radial motion by the locking ring 32 that is in its locking position, so that upon further displacement of the tool holder 24, the locking body 40 is pressed some distance axially rearward, with slaving of the spring-urged annular disk 45, in the oblong slot 39 before the locking body 40 can deflect radially upward (FIG. 12). Upon further insertion of the tool holder 24, the one locking pocket 38 of the three locking pockets 38 that is aligned with the locking body 40 comes to be beneath the locking body 40, and since the obliquely shaped annular disk 45 always presses the locking body 40 radially inward, the locking body 40 drops with an audible "click" into the locking pocket 38 (FIG. 13). Because of the tensed compression spring 33 and because of the annular disk 45, the locking body 40 is thrust forward in the locking pocket 38 enough that the annular disk 45 again rests on the locking ring 32. The locking body 40 or ball 41 is now entirely caught within the locking pocket 38. The tool holder 24 can be pulled forward only far enough that the axial boundary edge of the locking pocket 38 strikes the locking body 40 or ball 41.

For unlocking the tool holder 24 in order to remove the guide tube 11, the slide sleeve 34 must be pulled rearward in the direction of the tool housing 10, by grasping the depression 341. As a result, the locking ring 32 is pulled off the locking body 40 (FIG. 14). If the tool holder 24 is then thrust forward with the other hand, the locking body 40 is forced radially outward, and the tool holder 24 can be pulled all the way out of the guide tube 11. Once the slide sleeve 34 is released again, the locking body 40 is pressed back into its outset position into the oblong slot 39, as can be seen in FIG. 8.

The invention claimed is:

1. A hand power tool, comprising a guide tube; a tool holder interchangeably attachable to said guide tube; a locking device locking said tool holder to said guide tube and disposed on said guide tool; a slide sleeve manually releasing said locking device by an axial displacement oriented away from said tool holder, said guide tube having a guide portion provided for said tool holder in a front end region of said guide tube on an inner wall, said tool holder having an end portion configured for axial insertion into said guide portion, said locking device having at least one locking body retained radially displaceably in said guide tube and at least one locking pocket disposed in an end portion of said tool holder and open to said end portion of said tool holder so as to cooperate with said locking body for axially locking said tool holder a spring element resting in said locking pocket in such a way that upon insertion of said tool holder into said guide tube said spring permits a relative displacement of said end portion of said tool holder with respect to said guide portion of said guide tube until said locking body plunges into said locking pocket, said at least one locking body resting axially displaceably in an oblong slot that penetrates said wall of said guide tube, said spring-elastic blocking element pressing said locking body against a front edge, as considered in a displacement direction, of said oblong slot.

2. A hand power tool as defined in claim 1, wherein said at least one locking pocket has an axial length that amounts to a multiple of an axial length of said locking body.

3. A hand power tool as defined in claim 1, wherein said spring-elastic blocking element has an annular disk which is acted upon by an axially oriented spring force and which rests on a rear back side of said locking body, which rear back side is remote from said tool holder.

4. A hand power tool as defined in claim 3, wherein said annular disk rests axially on a locking ring, and the spring force acting axially on said annular disk being derived from a restoring spring that is braced on one end on said guide tube and on another end on said annular disk.

5. A hand power tool as defined in claim 1, wherein said end portion of said tool holder has a plurality of slaving pockets that are offset from one another by equal rotational angles on a circumference, said slaving pockets coming to an end in an open on a face end of said end portion of said tool holder, and an equal number of locking pockets that are axially closed and are offset by the same rotational angles on the circumference, said guide tube having a number of slaving bodies corresponding to a number of said slaving pockets, said slaving bodies being retained non displaceably in radial bores penetrating said wall of said guide tube, said slaving bodies resting in said radial bores and being adapted to one another for rotary slaving of said tool holder by said guide tube.

6. A hand power tool as defined in claim 1, wherein said locking device has a locking ring which is axially acted upon by a restoring spring, said ring in its locking position blocking a radial motion of said at least one locking body, said locking ring being coupled to a slide sleeve that is axially displaceable on said guide tube.

7. A hand power tool as defined in claim 1, wherein said locking ring is rigidly joined to said slide sleeve that is axially displaceable from said guide tube.

8. A hand power tool as defined in claim 1, and further comprising an axially limitly displaceable guided impact deflector hood disposed on said guide tube and plunging with one end into said end portion of said tool holder and also sealed off on an outside from said inner wall of said guide tube and on an inside from a header of a hammering mechanism.

9. A hand power tool as defined in claim 8, wherein said impact deflector hood is sealed off on the inside from the header on a front end of said impact deflector hood, which front end plunges into said tool holder.

10. A hand power tool as defined in claim 8, wherein said impact deflector hood has a front stop face for the header and is configured such that at a transition to an idling position of the tool said impact deflector hood absorbs an impact energy transmitted.

11. A hand power tool as defined in claim 1, and further comprising a tool housing, said guide tube being rotatably supported in said tool housing and protruding at one end out of said tool housing, said slide sleeve fitting on its end over said tool housing.

12. A hand power tool as defined in claim 1, wherein said at least one locking body is configured as balls.

13. A hand power tool as defined in claim 1, wherein the hand power tool is a power tool selected from the group consisting of a drill hammer and a jackhammer.

14. A hand power tool, comprising a guide tube; a tool holder interchangeably attachable to said guide tube; a locking device locking said tool holder to said guide tube and disposed on said guide tube; a slide sleeve manually releasing said locking device by an axial displacement oriented away from said tool holder, said guide tube having a guide portion provided for said tool holder in a front end region of said guide tube on an inner wall, said tool holder having an end portion configured for axial insertion into said guide portion, said locking device having at least one locking body retained radially displaceably in said guide tube and at least one locking pocket disposed in an end portion of said tool holder and open to said end portion of said tool holder so as to cooperate with said locking body for axially locking said tool holder a spring element resting in said locking pocket in such a way that upon insertion of said tool holder into said guide tube said spring permits a relative displacement of said end portion of said tool holder with respect to said guide portion of said guide tube until said locking body plunges into said locking pocket, said spring element having an annular portion crossing said locking pocket and pressable counter to a spring force into a transverse groove provided in a bottom of said locking pocket, said annular portion of said spring element resting in an annular groove of said end portion of said tool holder and crossing said locking pocket, said annular groove of said end portion of said tool holder being graduated in a radial direction and having an upper groove portion with a greater groove width and a groove depth corresponding to a depth of said locking pocket, and a lower groove portion with a smaller groove width, said annular groove having groove flanks that are shaped such that said spring element resting in said upper groove portion is pressable into said lower groove portion solely upon insertion of said tool holder into said guide tool.

15. A hand power tool as defined in claim 14, wherein said at least one locking pocket has an axial length that amounts to a multiple of an axial length of said locking body.

16. A hand power tool as defined in claim 14, wherein said annular groove has a rear groove flank when considered in an insertion direction of said tool holder, that is positioned at an acute angle counter to the insertion direction, and a front groove flank as considered in the insertion direction, that extends substantially radially.

17. A hand power tool as defined in claim 14, wherein said at least one locking body is retained axially non displaceably in a radial bore that penetrates said wall of said guide tube.

18. A hand power tool as defined in claim 14, wherein said at least one locking pocket and said at least one locking body plunging into said at least one locking pocket are adapted to one another for rotary slaving of said tool holder by said guide tube.

19. A hand power tool as defined in claim 14, wherein said end portion of said tool holder has a plurality of said locking pockets disposed offset from one another by rotational angles on a circumference, said guide tube having an equal number of said locking bodies that are offset from one another by rotational angles in a circumferential direction, said rotational angles between successive ones of said locking pockets and said rotational angles between successive ones of said locking bodies being equivalent to one another.

20. A hand power tool as defined in claim 14, wherein said locking device has a locking ring which is axially acted upon by a restoring spring, said ring in its locking position blocking a radial motion of said at least one locking body, said locking ring being coupled to a slide sleeve that is axially displaceable on said guide tube.

21. A hand power tool as defined in claim 20, and further comprising a tool housing, said guide tube being rotatably supported in said tool housing and protruding at one end out of said tool housing, said slide sleeve fitting on its end over said tool housing.

22. A hand power tool as defined in claim 20, wherein said locking ring is rigidly joined to said slide sleeve that is axially displaceable on said guide tube.

23. A hand power tool as defined in claim 14, and further comprising an axially limitly displaceable guided impact deflector hood disposed on said guide tube and plunging with one end into said end portion of said tool holder and also sealed off on an outside from said inner wall of said guide tube and on an inside from a header of a hammering mechanism.

24. A hand power tool as defined in claim 23, wherein said impact deflector hood is sealed off on the inside from the header on a front end of said impact deflector hood, which front end plunges into said tool holder.

25. A hand power tool as defined in claim 23, wherein said impact deflector hood has a front stop face for the header and is configured such that at a transition to an idling position of the tool said impact deflector hood absorbs an impact energy transmitted.

26. A hand power tool as defined in claim 14, wherein said at least one locking body is configured as balls.

27. A hand power tool as defined in claim 14, wherein the hand power tool is a power tool selected from the group consisting of a drill hammer and a jackhammer.

\* \* \* \* \*